(12) United States Patent
Palamadai

(10) Patent No.: US 12,206,673 B2
(45) Date of Patent: Jan. 21, 2025

(54) PRIVACY, PERMISSION, AND USER SAFETY MANAGEMENT VIRTUAL ASSISTANT FOR A COMMUNICATION SESSION

(71) Applicant: AT&T Intellectual Property I, L.P., Atlanta, GA (US)

(72) Inventor: Rashmi Palamadai, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 546 days.

(21) Appl. No.: 17/470,451

(22) Filed: Sep. 9, 2021

(65) Prior Publication Data
US 2023/0074261 A1 Mar. 9, 2023

(51) Int. Cl.
*H04L 9/40* (2022.01)
*H04L 65/1069* (2022.01)
*H04L 65/401* (2022.01)

(52) U.S. Cl.
CPC ........ *H04L 63/102* (2013.01); *H04L 65/1069* (2013.01); *H04L 65/4015* (2013.01)

(58) Field of Classification Search
CPC ......... H04L 63/10–108; H04L 65/1069; H04L 65/4015
See application file for complete search history.

(56) References Cited

U.S. PATENT DOCUMENTS 9,007,473 B1 * 4/2015 Worley, III ......... G06F 21/6218
348/42
9,818,228 B2 * 11/2017 Lanier .................. H04W 12/06
(Continued)

OTHER PUBLICATIONS

Lodola, Alex, Mixed reality vs augmented reality: what's the difference?; Mixed reality vs augmented reality: what's the difference?—Aniwaa blog https://www.aniwaa.com/blog/mixed-reality-vs-augmented-reality-whats-the-difference/; Aug. 11, 2021; pp. 1-4.

*Primary Examiner* — Madhuri R Herzog
(74) *Attorney, Agent, or Firm* — Guntin & Gust, PLC; Matthew Tropper

(57) ABSTRACT

Aspects of the subject disclosure may include, for example, obtaining a first user profile associated with a first user, the first user profile comprising a first privacy rule; obtaining a second user profile associated with a second user, the second user profile comprising a second privacy rule; determining which of the first privacy rule or the second privacy rule is more restrictive; setting for a first extended reality (XR) communication session a third privacy rule, the third privacy rule being set to the first privacy rule in a first case that the first privacy rule has been determined to be more restrictive than the second privacy rule and the third privacy rule being set to the second privacy rule in a second case that the second privacy rule has been determined to be more restrictive than the first privacy rule; creating the first XR communication session, the first XR communication session comprising one or more environments, the one or more environments supporting the first user and the second user; and facilitating communications via the one or more environments, the communications being between a first communication device used by the first user and a second communication device used by the second user, the communications being enforced to comply with the third privacy rule. Other embodiments are disclosed.

20 Claims, 10 Drawing Sheets

(56) References Cited

U.S. PATENT DOCUMENTS

| | | | |
|---|---|---|---|
| 2015/0172262 A1* | 6/2015 | Ortiz, Jr. ............. | H04W 12/068 |
| | | | 715/706 |
| 2018/0309808 A1* | 10/2018 | Andon .................... | G06T 19/20 |
| 2019/0107990 A1* | 4/2019 | Spivack ................. | G06T 11/60 |

* cited by examiner

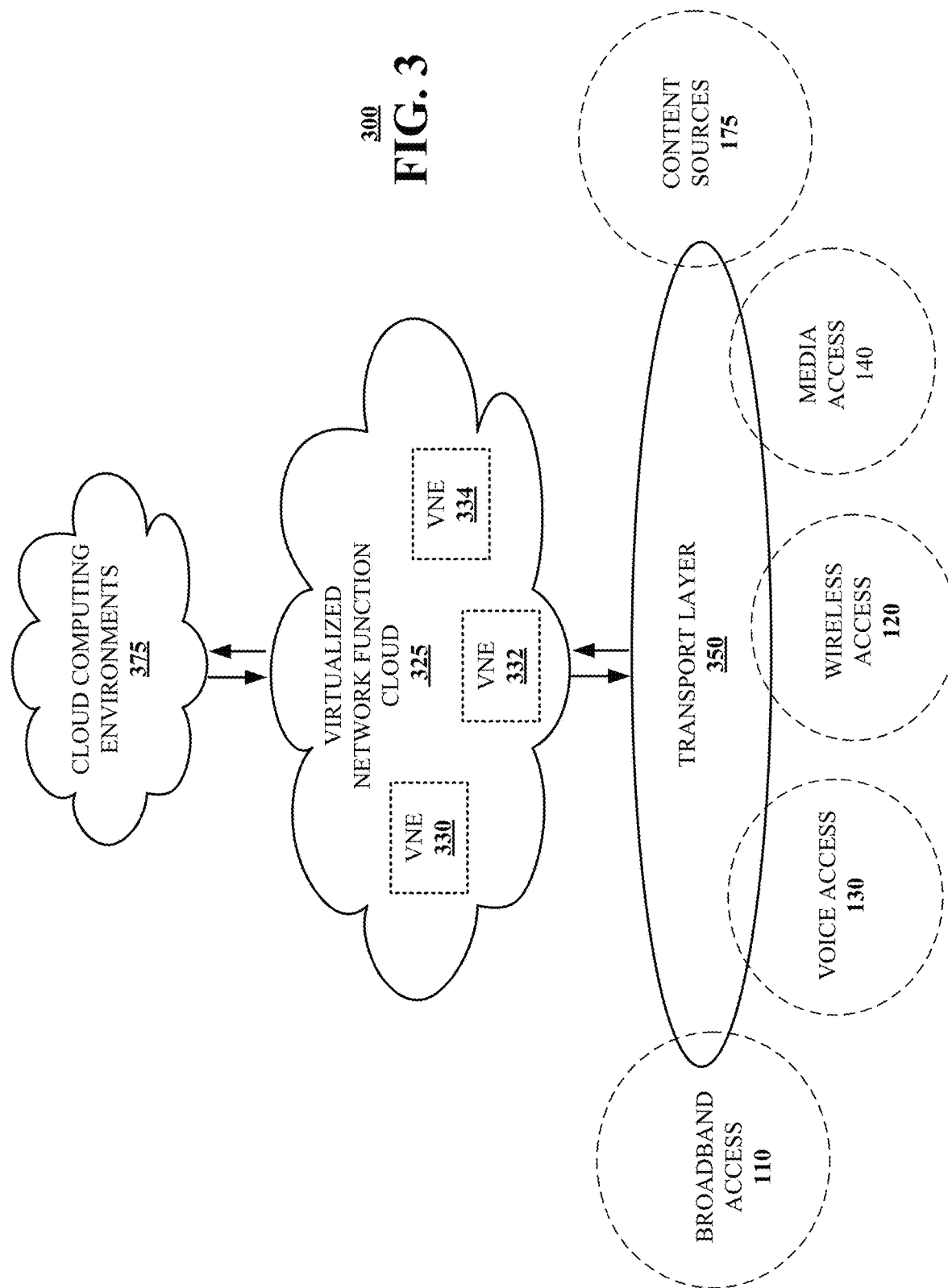

PRIVACY, PERMISSION, AND USER SAFETY MANAGEMENT VIRTUAL ASSISTANT FOR A COMMUNICATION SESSION

FIELD OF THE DISCLOSURE

The subject disclosure relates to a privacy, permission, and user safety management virtual assistant for a communication session.

BACKGROUND

Various types of communication sessions exist. Communication sessions can include telephone conferences, video conferences and/or extended reality (sometimes referred to herein as XR) communication sessions. XR communication sessions can include augmented reality (sometimes referred to herein as AR), mixed reality (sometimes referred to herein as MR), and/or virtual reality (sometimes referred to herein as VR). In AR, virtual information is overlaid on a real-world view. MR is similar to AR, but in MR digital content (e.g., 3D digital content) can be spatially aware and responsive. In VR, the view is simulated. In various examples, AR environments, MR environments, and/or VR environments can be provided via googles, glasses, or other display screens.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for providing privacy, permission, and user safety management for a communication session. Other embodiments are described in the subject disclosure.

One or more aspects of the subject disclosure include a virtual assistant (sometimes referred to herein as VA) that creates a communication session (e.g., an XR communication session) with multiple environments, wherein the VA controls the privacy, permission, and safety of the individuals in each of the environments (across the communication session).

One or more aspects of the subject disclosure include a VA that determines whether a communication session (e.g., an XR communication session) has one or more minor children as participant(s), and accordingly requests for (and enforces) parental controls and safety measures to protect the privacy and content that is accessed/shared in each of the environments (across the communication session).

One or more aspects of the subject disclosure include a VA that identifies (e.g., for a given communication session) the "highest authority figure." In one example, when a predetermined time limit for a communication session has been reached, a user's VA can negotiate with respective VAs of other attendee(s) (and/or directly with the other attendees(s)) for more time (e.g., based on pre-decided limits, schedule(s), etc.).

One or more aspects of the subject disclosure include a VA (e.g., a system VA) that manages the logistics, flow, and experience between virtual/mixed and physical (and vice-versa) based on user identity/authority/privileges and "trust" relationships.

One or more aspects of the subject disclosure include a VA that leads users into known secondary environment(s)—and can provide such secondary environment(s) for all or a subset of users in an existing communication session.

One or more aspects of the subject disclosure include a VA (e.g., a system VA) that has a "Safe Space" protocol to protect each user's identify, safety, and privacy.

One or more aspects of the subject disclosure include a VA that tracks the user(s) as they are moving between communication sessions and environments. In one example, data indicative of such tracking can be logged and/or provided to the "highest authority figure" for data analysis and record-keeping.

Figure 1:
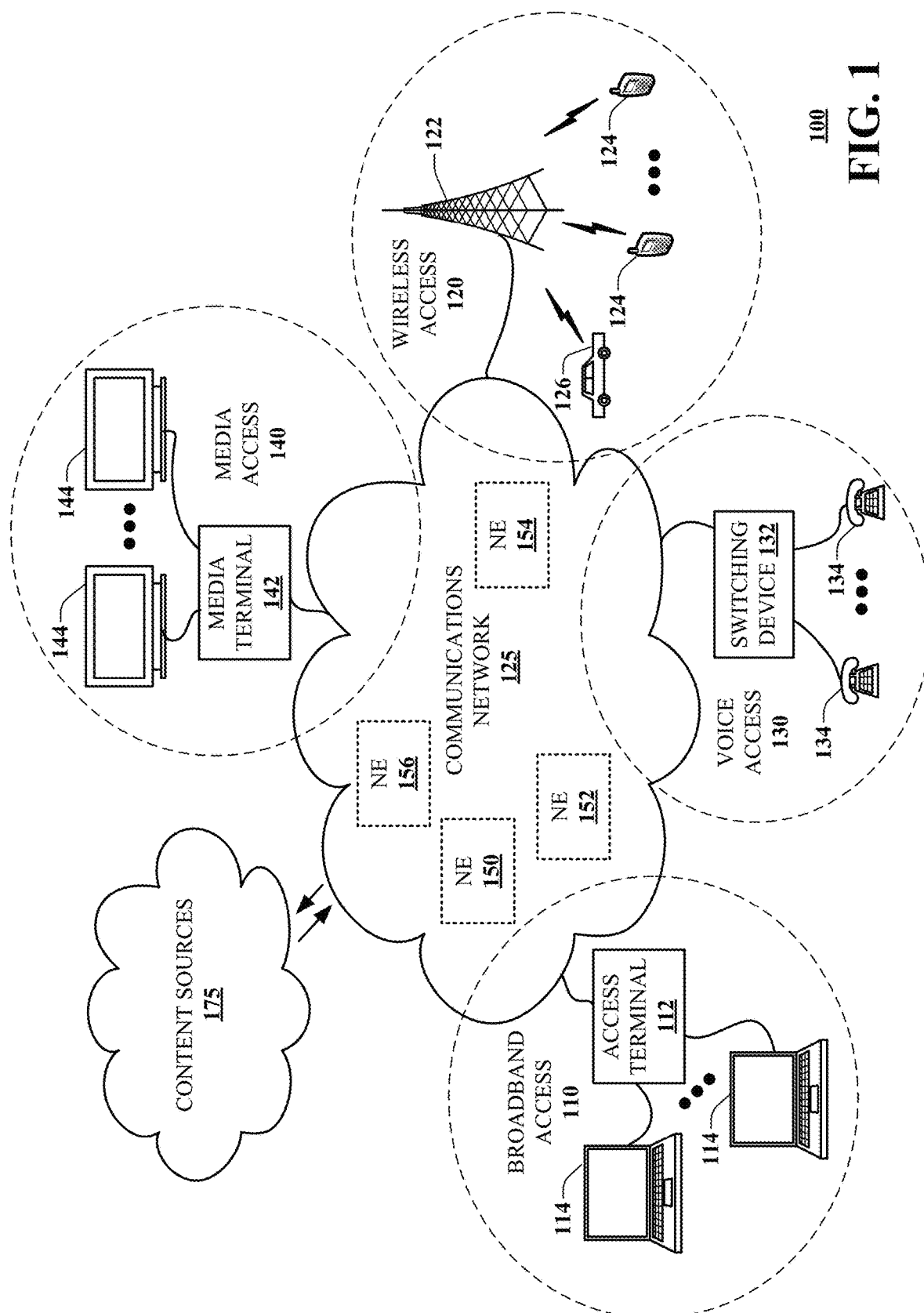
FIG. 1 is a block diagram illustrating an example, non-limiting embodiment of a communication network in accordance with various aspects described herein.

Referring now to FIG. 1, a block diagram is shown illustrating an example, non-limiting embodiment of a system 100 in accordance with various aspects described herein. For example, system 100 can facilitate in whole or in part a VA that implements privacy, permission, and/or user safety management in a communication session. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
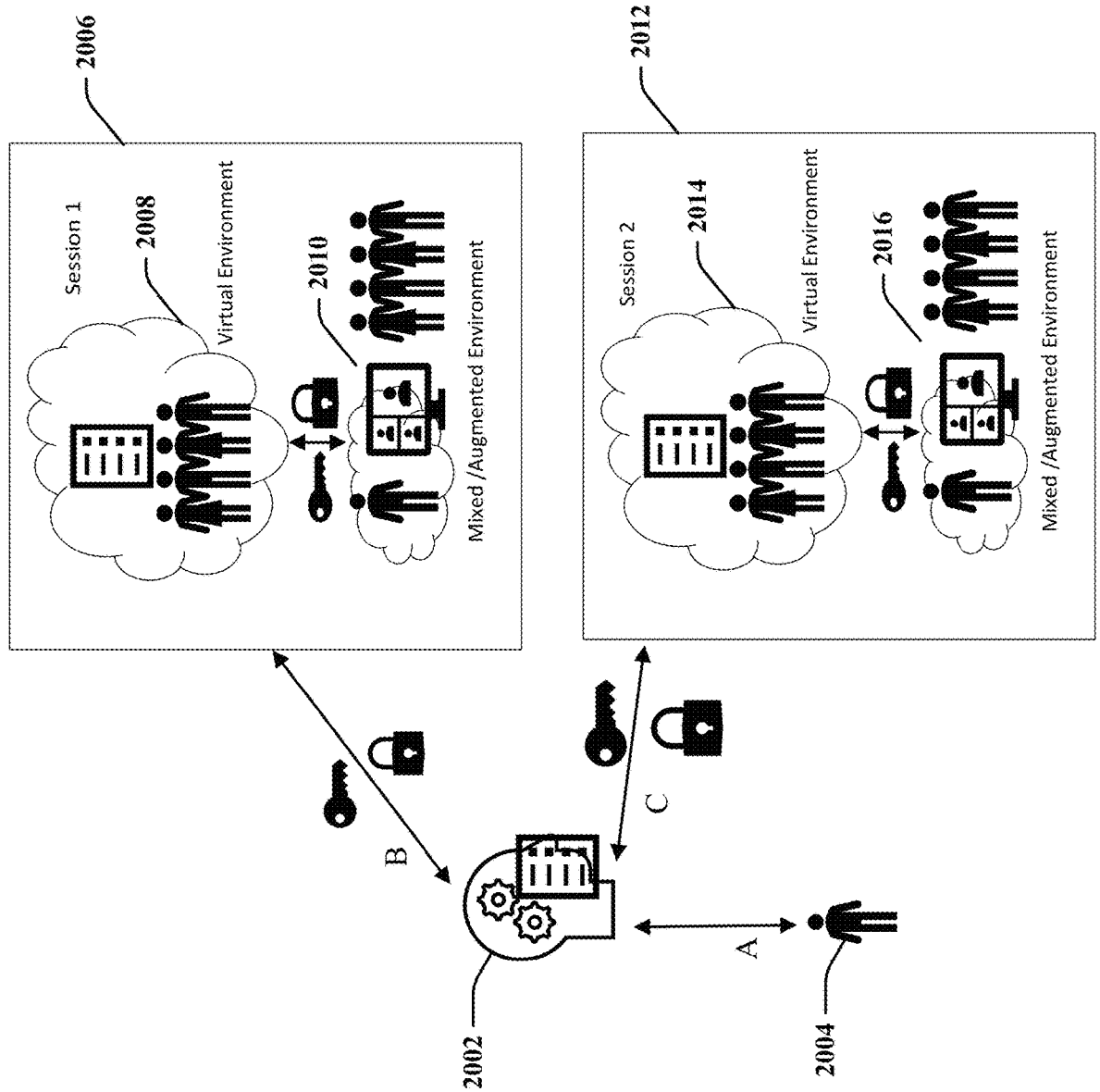
FIG. 2A is a block diagram illustrating an example, non-limiting embodiment of a system (that can function fully or partially within the communication network of FIG. 1) in accordance with various aspects described herein.

Referring now to FIG. 2A, this is a block diagram illustrating an example, non-limiting embodiment of a system 2000 (that can function fully or partially within the communication network of FIG. 1) in accordance with various aspects described herein. As seen in this figure, VA 2002 (which can comprise software, firmware, hardware, or a combination thereof) is provided. VA 2002 can be configured to communicate bidirectionally (see arrow "A") with a communication device (not shown) of a user 2004. Further, VA 2002 can manage identity, access, privacy, security, and safety among various communication sessions (e.g., XR communication sessions) and various environments of such communication sessions.

Still referring to FIG. 2A, it is seen that in this example the VA 2002 can create (and/or manage) communication session 2006 (see arrow "B"). Communication session 2006 includes, in this example, virtual environment (or VR environment) 2008 and mixed/augmented environment (or MR/AR environment) 2010. In various examples, virtual environment 2008 can be in bidirectional communication with mixed/augmented environment 2010. In various examples, virtual environment 2008 can support one or more other users besides user 2004 and mixed/augmented environment 2010 can support one or more other users besides user 2004. Further still, it is seen that in this example the VA 2002 can create (and/or manage) communication session 2012 (see arrow "C"). Communication session 2012 includes, in this example, virtual environment (or VR environment) 2014 and mixed/augmented environment (or MR/AR environment) 2016. In various examples, virtual environment 2014 can be in bidirectional communication with mixed/augmented environment 2016. In various examples, virtual environment 2014 can support one or more other users besides user 2004 and mixed/augmented environment 2016 can support one or more other users besides user 2004.

Figure 2B:
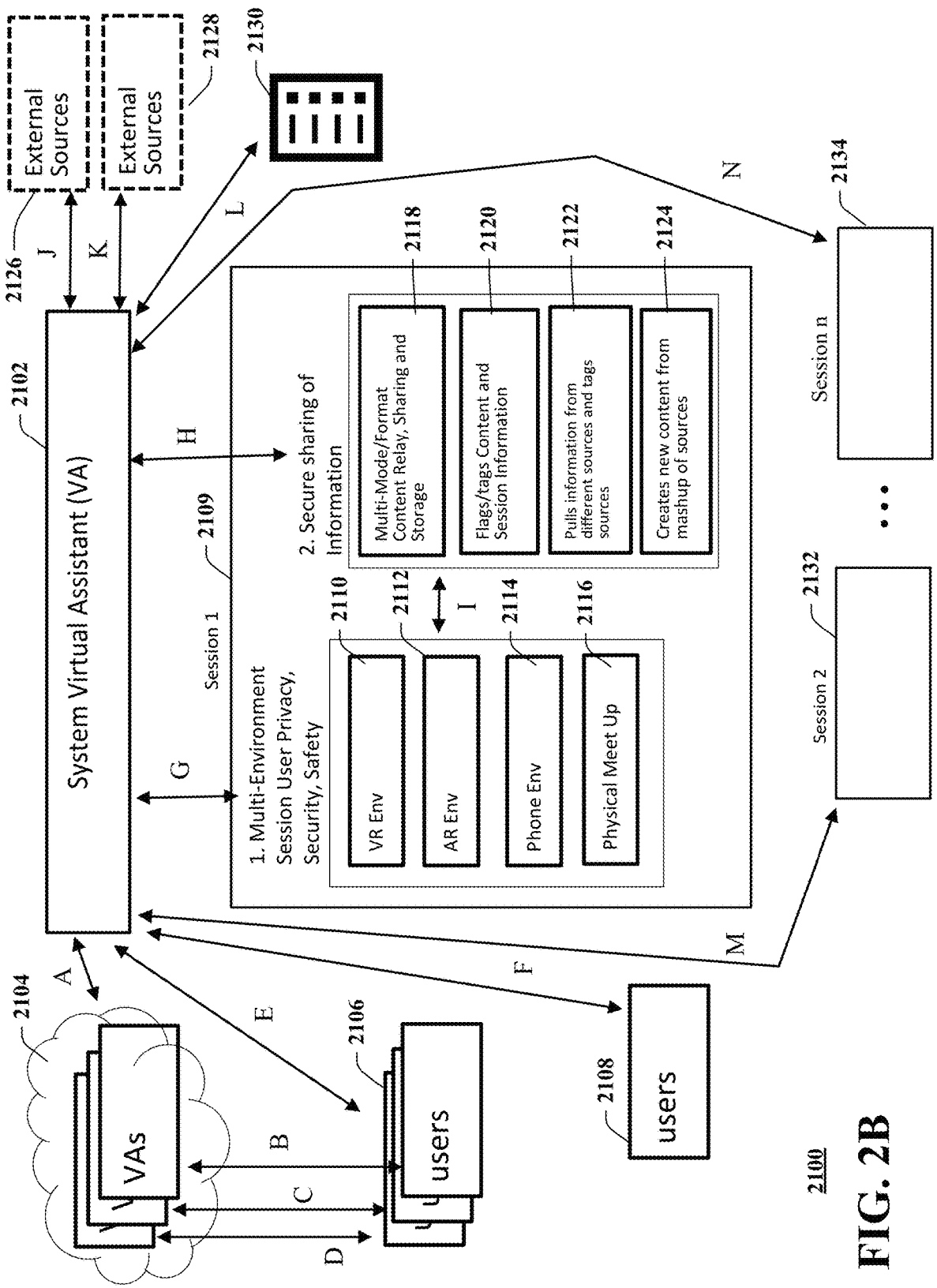
FIG. 2B is a block diagram illustrating an example, non-limiting embodiment of a system flow (that can function fully or partially within the communication network of FIG. 1) in accordance with various aspects described herein.

Referring now to FIG. 2B, this is a block diagram illustrating an example, non-limiting embodiment of a system flow 2100 (that can be implemented fully or partially within the communication network of FIG. 1) in accordance with various aspects described herein. As seen in this figure, the system VA 2102 can perform (and/or facilitate) various functions. The system VA 2102 is in bidirectional communications (see arrow "A") with a plurality of VAs (labelled collectively as 2104). This bidirectional communication via arrow "A" can facilitate mutual "trusted" VA relationship by prior review/identity confirmation, permissions, settings, etc. Further, each VA of 2014 corresponds to a respective user (labelled collectively as 2106; see also arrows "B", C" and "D"). Further still, system VA 2102 can communicate directly with one or more users 2108 (see arrow "F"). This bidirectional communication via arrow "F" can facilitate VA verifying identity, preserving user privacy, sharing/confirming session privacy, security, and/or safety restrictions in advance. Further still, system VA 2102 creates and facilitates operation of communication session 1 (labelled as element 2109). As seen, communication session 1 includes multi-environment session user privacy, security, and safety in the context of VR environment 2110, AR environment 2112, phone environment 2114, and physical meetup 2116. System VA 2102 can bidirectionally communicate (see arrow "G") with elements 2110, 2112, 2114, 2116. Further still, communication session 1 includes secure sharing of information in the context of multi-mode/format content relay, sharing and storage 2118, flags/tags content and session information 2120, pulls information from different sources and tags sources 2122, and creates new content from mashup of sources 2124. System VA 2102 can bidirectionally communicate (see arrow "H") with elements 2118, 2120, 2122, 2124. Further still, each of elements 2110, 2112, 2114, 2116 can communicate with each of elements 2118, 2120, 2122, 2124 (see arrow "I").

Still referring to FIG. 2B, system VA 2102 is in bidirectional communication with external sources 2126 (see arrow "J") and system VA 2102 is in bidirectional communication with external sources 2128 (see arrow "K"). This bidirectional communication via arrows "J" and "K" can facilitate secure information transfer and sharing. Further, system VA 2102 is in bidirectional communication with external data store 2130 (see arrow "L"). This bidirectional communication via arrow "L" can facilitate storing and sharing context, content, and/or user activity between environments and communication sessions.

Still referring to FIG. 2B, system VA 2102 can spawn new sessions and environments and manage privacy, security, permission, and trusted relationships between the sessions and environments. In this example, system VA 2102 creates and facilitates operation of communication session 2 (labelled as element 2132) and communication session n (labelled as element 2134). Of course, any desired number of communication sessions can be created and operated. As shown by arrow "M", system VA 2102 is in bidirectional communication with session 2 and as shown by arrow "N", system VA 2102 is in bidirectional communication with session n. In this example, each of communication session 2 and n is similar to communication session 1 (that is, in this example, each of communication session 2 and n includes structure and functionality that is similar to communication session 1).

As described herein, various embodiments can provide a system that is responsible for the identity/access management, privacy, security, and safety of the individual users who are in a communication session (e.g., an XR communication session) that has multiple users in multiple environments (e.g., VR, AR, Mixed Reality, Physical).

As described herein, various embodiments can provide functionality in the context of a setting where children can decide to meet up virtually. In various examples, the parents can utilize a "trusted" system that can monitor against violation(s) of parental control(s)/permission(s)/restriction(s) and recognize the parent(s) as the authority figure(s). In one specific example, a particular parent can be the "highest authority figure".

As described herein, various embodiments can provide a system that manages user privacy/security and safety. In various examples, the system can transparently monitor who is within the communication session(s)/environment(s), and who is transitioning between communication session(s)/environment(s).

As described herein, various embodiments can provide functionality in the context of a professional situation or a social situation, wherein the users may want to limit certain communication session(s) and environment(s) around identity. In various examples, functionality can be provided in the context of a situation where there needs to be a prioritization so that communication session(s)/environment(s) can be setup on basis of user priority.

As described herein, various embodiments can provide a system that manages logistics between communication session(s) and environment(s). In various examples, the logistics can be managed carefully so that users' identity, privacy, and security are not compromised. In various examples, having a "trust" relationship with the communication session creator can allow for "automatic acceptance" of system VA actions—with the understanding that the system VA is protecting the users who are part of the communication session per pre-determined and known settings.

As described herein, various embodiments can provide functionality in the context of a communication session and environment, wherein there is a situation involving a person being bullied and/or threatened. In various examples, the system VA provides a way to "rescue" such people by issuing a "Safe Space" protocol—that simultaneously records the violation, expels the violator and protects the user(s) within a "Safe Space".

Reference will now be made to a description of a system according to another embodiment. This embodiment can provide certain functionality by which a VA implements privacy, permission, and/or user safety management in one or more communication sessions. More particularly, the system can include:

1. A virtual assistant that creates a communication session with multiple environments, and controls the privacy, permission, and safety of the individuals in each of the environments/across the communication session.

A system VA can cross check and reference the identity and access privileges of the participants, allowing entry into the communication session/specific environments.

A system VA can grant specific communication session privileges to the users who have been identified as admins or higher-level authority figures.

A system VA can indicate the admins/higher-authority users through specific graphics/icons/audio so that when the user(s) share content between environments, all attendees can acknowledge them accordingly.

A system VA can control the privacy of the attendees per the pre-specified limits set by each user profile (this can be set prior to entering the communication session), and enforce the communication session privacy/security rules.

2. A virtual assistant can determine whether a communication session has minor children, and accordingly can request for and enforce parental controls and safety measures to protect the privacy and content that is accessed/shared across the environment(s)/session(s).

A VA can ensure that minor children accounts are setup with specific parental restrictions/permissions prior to child being allowed to enter the communication session.

A VA can determine that if this is a communication session with minor children, the most restrictive parental controls are implemented across the communication session regardless of how much/less permission other minor users have.

3. A virtual assistant can identify the "highest authority figure" and negotiate with other attendee VAs (and/or directly with the attendees) for more time based on pre-decided limits, schedule, etc.

When time limits are reached, and users indicate either by direct request or by setting thresholds in advance—VA begins to negotiate and coordinate between each of the environments to continue for a set amount of time.

VA negotiates for users to stay within their environment to continue, or provides alternative to continue (e.g., moves users from virtual to mixed environments).

VA offers the choice to bring users together in the same environment or per user specification, in different environments again.

The "highest authority figure" has certain privileges—depending on pre-determined settings—that are broader/more expansive than the remaining session guests.

In various examples, this "highest authority figure" can interact with the VA in a number of different ways. In a particular circumstance, this highest authority figure has equal privileges to the VA and can act as a "manual operator".

In a particular circumstance, the highest authority figure has greater authority/privilege, and can override the VA.

In one specific example: if the session is owned by an individual user and that user is inviting guests to join a personal VR session, the user can have the same or greater authority/privileges as the VA. However, if a user is participating in a work related session, even though they may have higher authority than some users, perhaps would not have the highest authority (e.g., be unable to override the Office VA system).

Reference will now be made to a description of a system according to another embodiment. This embodiment can provide certain functionality by which a VA implements privacy, permission, and user safety management in one or more communication sessions. More particularly, the system can include:

1. A system virtual assistant can manage the logistics, flow and experience between virtual, mixed and physical, and vice-versa based on user identity/authority/privileges and "trust" relationships.

A system VA allows user to actively choose or be "led" into communication sessions (e.g., VR sessions) and/or transition between communication sessions (both VR and mixed) based on user access privileges/authority.

User can "accept" all transitions from system VA when "trust" has been established (e.g., in a professional setting, the attendees of this communication session (e.g., virtual session) would "automatically accept" all new communication sessions and transitions that are managed by system VA.

VA offers options to the users to continue within their respective environments or transition into different environments depending on the system limits (e.g., time limit reached).

2. A VA can lead users into known secondary environment(s)—and can provide such environment(s) for all or a subset of users in the existing communication session.

A VA creates subset of users (e.g., by request from authorized user) and leads these people into the secondary environment.

A VA allows user to accept or deny this transition, or request to stay within the existing environment depending on user identity and credentials.

VA settings can support forced entry and/or purge (or limit this ability) depending on the user credentials (e.g., parent would be allowed in all minor children's communication sessions and could not be "expelled" from the communication session involuntarily).

Reference will now be made to a description of a system according to another embodiment. This embodiment can provide certain functionality by which a VA implements privacy, permission, and user safety management in one or more communication sessions. More particularly, the system can include:

1. A system virtual assistant can create a "Safe Space" protocol

System VA is authorized to create a "safe space" if it detects bullying, threats, and/or inappropriate language and bring the users into this safe space.

Example: If minor children are in a group together, and the VA system detects inappropriate language and/or threats against the children, it will "pull" the children into a "safe space".

Parents/authority figures would be alerted that the children were placed into "safe space".

System VA would track/note cause of this action.

A child's parent(s)/guardian(s) would be able to reach the minor children in this "safe space" and communicate with them.

A "Family Safe Space" can be created by the user or family VA system to get all family members into the same safe space in the event of a threatening situation.

Multiple methods of communication between parent-child would be made available (e.g., Phone, VR session, augmented session)—where the parent can access/view why the "Safe Space Protocol" was generated.

System VA is allowed to "expel" those users who violate specific parental restrictions/permissions.

System VA tracks the specific reason why the Safe Space protocol was engaged—who violated, when, and how.

VA performs security scans prior to and during communication sessions, and identifies breaches of privacy and security.

VA attempts to address (or does address) security/privacy breach in real time.

VA expels the user(s) that are causing the issue.

VA moves the remaining user(s) to the "safe space" communication session and environment.

VA indicates that there was a safety/privacy breach that "forced" this action.

Reference will now be made to a description of a system according to another embodiment. This embodiment can provide certain functionality by which a VA implements privacy, permission, and user safety management in one or more communication sessions. More particularly, the system can include:

1. A VA can track the user(s) as they are moving between communication sessions and environments.

Depending on the privacy settings of the communication session, the VA tracks the users' movements between the environments within a communication session and/or between multiple communication sessions.

VA maintains logs and can provide to communication session organizer and highest authority figure with these details for further data analysis and/or record-keeping.

Highest Authority User can choose to receive copies and/or simply have access to these logs for future reference.

Logs are securely stored and (in one example) cannot be accessed by all session participants.

As described herein, various embodiments can provide a VA that creates a communication session (e.g., an XR communication session) and allows entry (and/or re-entry) of user(s) into the communication session. In various examples, the communication session can comprise one or more virtual environments, one or more augmented environments, and/or one or more mixed environments. In various examples, the VA can coordinate with one or more user VAs (and/or directly with one or more users) to check identity and/or privacy settings. In various examples, the VA can share communication session settings/rules/restrictions so that there is full transparency of what is expected within the communication session—thereby creating a system of "trust". In various examples, once a given user is within the communication session/specific environment(s), they will comply (and/or be made to comply) with the communication session and environment rules.

As described herein, various embodiments can provide functionality such that, while in a communication session, the VA identifies the user(s) that need to have "higher authority"—this can help prioritize the action(s) around a user/specific group of users. In various examples, the VA prioritizes "higher authority" user(s) while creating new communication sessions. In various examples, when time limits are reached, the VA begins to negotiate and coordinate between each of the environments to continue for a set amount of time (in one specific example, the time limits can be set by user(s) either by direct request and/or by setting thresholds in advance; in another specific example, the VA can begin such negotiation/coordination responsive to user(s) indicating either by direct request and/or by setting thresholds in advance). In various examples, the VA negotiates for users to stay within their environment to continue, or provides alternative to continue (e.g., moves users from virtual to mixed environment). In one specific example, the VA offers the choice to bring users together in the same environment or per user specification, in different environments again.

As described herein, various embodiments can provide a system VA that can manage the logistics, flow, and experience between virtual, mixed, and physical, and vice-versa based on user identity/authority/privileges and "trust" relationships. In various examples, a given user may "accept" all transitions from system VA when "trust" has been established (e.g., in a professional setting, the attendees of a given communication session (e.g., virtual session) would "automatically accept" all new communication sessions and transitions that are managed by the system VA. In various examples, the VA offers options to the users to continue within their respective environments or transition into different environments depending on the system limits (e.g., time limit reached).

As described herein, various embodiments can provide a VA that leads users into one or more known secondary environments—and the VA can provide such secondary environment for all or a subset of users in the existing communication session. In various examples, the VA creates a subset of users (e.g., by request from authorized user) and leads these people into the secondary environment. In various examples, the VA allows user to accept or deny this transition, or request to stay within the existing environment (e.g., depending on user identity and credentials). In various examples, the VA settings can support forced entry and/or purge (and/or limit this ability) depending on the user credentials (e.g., parent would be allowed in all minor childrens' communication sessions and could not be "expelled" from the communication session involuntarily).

As described herein, various embodiments can provide a system VA that creates a "Safe Space" protocol. In various examples, the system VA is authorized to create a "safe space" if it detects bullying, threats, and/or inappropriate language and bring one or more of the users into this safe space. In one specific example: if minor children are in a group together, and the system VA detects inappropriate language and/or threats against the children, it will "pull" the children into a "safe space". In another example, parent(s) and/or authority figure(s) would be alerted that the children were placed into "safe space". In various examples, the system VA can track/note cause(s) of various action(s). In various examples, the system VA can track/note the various action(s) themselves. In various examples, the system VA is allowed to "expel" those user(s) who violate specific parental restriction(s)/permission(s). In various examples, the system VA tracks the specific reason why the Safe Space protocol was engaged—who violated, when, and how.

As described herein, various embodiments can provide a VA that: (a) performs security scans prior to and during communication sessions, and identifies breaches of privacy and security; (b) attempts to address (or addresses) security/privacy breach in real time; (c) expels the user(s) that are causing the issue(s); (d) moves the remaining user(s) to a "safe space" communication session and environment; and/or (e) indicates that there was a safety/privacy breach that "forced" this action.

As described herein, various embodiments can provide a VA that tracks the user(s) as they are moving between communication sessions and environments. In various examples, depending on the privacy settings of the communication session, the VA tracks the users' movements between the environments within a communication session and/or between multiple communication sessions. In various examples, the VA maintains logs and can provide to communication session organizer and/or highest authority figure these details for further data analysis and/or record-keeping.

As described herein, various embodiments can provide verification of a user before such user joins a communication session. In one example, the verification can comprise verifying the user's identity (that is, you are who you say you are). In another example, the verification can comprise verifying that the user is connecting from a reliable and/or secure device.

As described herein, various embodiments can provide mechanisms to enforce an employer code of conduct.

As described herein, various embodiments can provide mechanisms to monitor communications and keep security, identity, safety, and privacy secure (e.g., end-to-end). In one example, this can be applied to every person involved (e.g., a trusted environment).

As described herein, various embodiments can provide mechanisms to implement a "Safe Space". In one example, such a "Safe Space" can be created if there is a violation of one or more rules (e.g., bullying, inappropriate language). In various examples, such a violation of one or more rules can cause: (a) taking of action (e.g., move children into a safe space and/or expel a bully from a communication session); and/or (b) recording the action(s) taken. In various examples, such a safe space can be applied to children and/or adults.

As described herein, various embodiments can provide mechanisms to stop someone from pulling more information than the users had agreed to.

As described herein, various embodiments can provide mechanisms to take one or more actions based upon language analysis.

As described herein, various embodiments can provide mechanisms to take one or more actions based upon asset sharing (and/or attempted asset sharing).

As described herein, various embodiments can provide mechanisms to take one or more actions based upon one more aberrations.

As described herein, various embodiments can provide mechanisms that operate in the context of any desired immersive and/or hybrid environment (e.g., extended reality).

As described herein, various embodiments can provide functionality wherein the participants agree to a protocol before a given communication session.

As described herein, various embodiments can provide mechanisms to implement a hierarchy of participants.

As described herein, various embodiments can provide mechanisms to implement different age-appropriate restrictions (e.g., use most restrictive parental controls across the board).

As described herein, various embodiments can provide mechanisms to implement time management. In one example, a set of users can start in a communication session and at the end of a set amount of time a subset of the users can be allowed to remain in an extended communication session.

As described herein, various embodiments can provide mechanisms to enable a VA to transition between different communication sessions and/or different environments.

As described herein, various embodiments can provide mechanisms to implement (e.g., for a given communication session) a time limit and/or a bandwidth limit.

As described herein, various embodiments can provide mechanisms to implement functionality in the context of a school environment (e.g., there can be a hierarchy such as Principal→Teacher→Parent).

As described herein, various embodiments can provide mechanisms to implement functionality wherein a person (e.g., an authority figure such as a parent) can be queried in real-time to get approval to go beyond a pre-agreed protocol.

As described herein, various embodiments can provide mechanisms to implement various states of operation, such as: (a) pre-session (e.g., creation of protocol(s)); (b) session (e.g., communication session conversations/interaction); and (c) post-session (e.g., logs, share context and content that was discussed).

As described herein, various embodiments can provide mechanisms to implement functionality such that all participants can have trust that the system has verified everyone participating (e.g., everyone participating in a given communication session).

As described herein, various embodiments can provide mechanisms to implement different environments for personal, professional, and/or social contexts.

As described herein, various embodiments can provide mechanisms to implement functionality wherein only a "handle (e.g., nickname) is shown in a certain environment (in one specific example, no contact information is shown).

As described herein, various embodiments can provide a plurality of virtual assistants, wherein each virtual assistant corresponds to each of a plurality of users, and wherein each virtual assistant has a professional profile, a family profile, an anonymous (public) profile, etc.

As described herein, various embodiments can provide a system virtual assistant that can interface with (e.g., check, communicate with) a given user directly in a case that the given user has no personal virtual assistant. In one specific example, the system virtual assistant can constantly be monitoring (e.g., checking for anomalies).

As described herein, various embodiments can provide aspects of "privacy". Further, various embodiments can provide aspects of "security" (e.g., creation of "trust" through: (a) prior vetting; and/or (b) monitoring to ensure that there is compliance/no breech of the agreed T&C (terms and conditions) of the communication session. Further, various embodiments can provide aspects of "safety management" (e.g., creation and maintenance of the "Safe Space" and/or the "Family Safe Space").

Figure 2C:
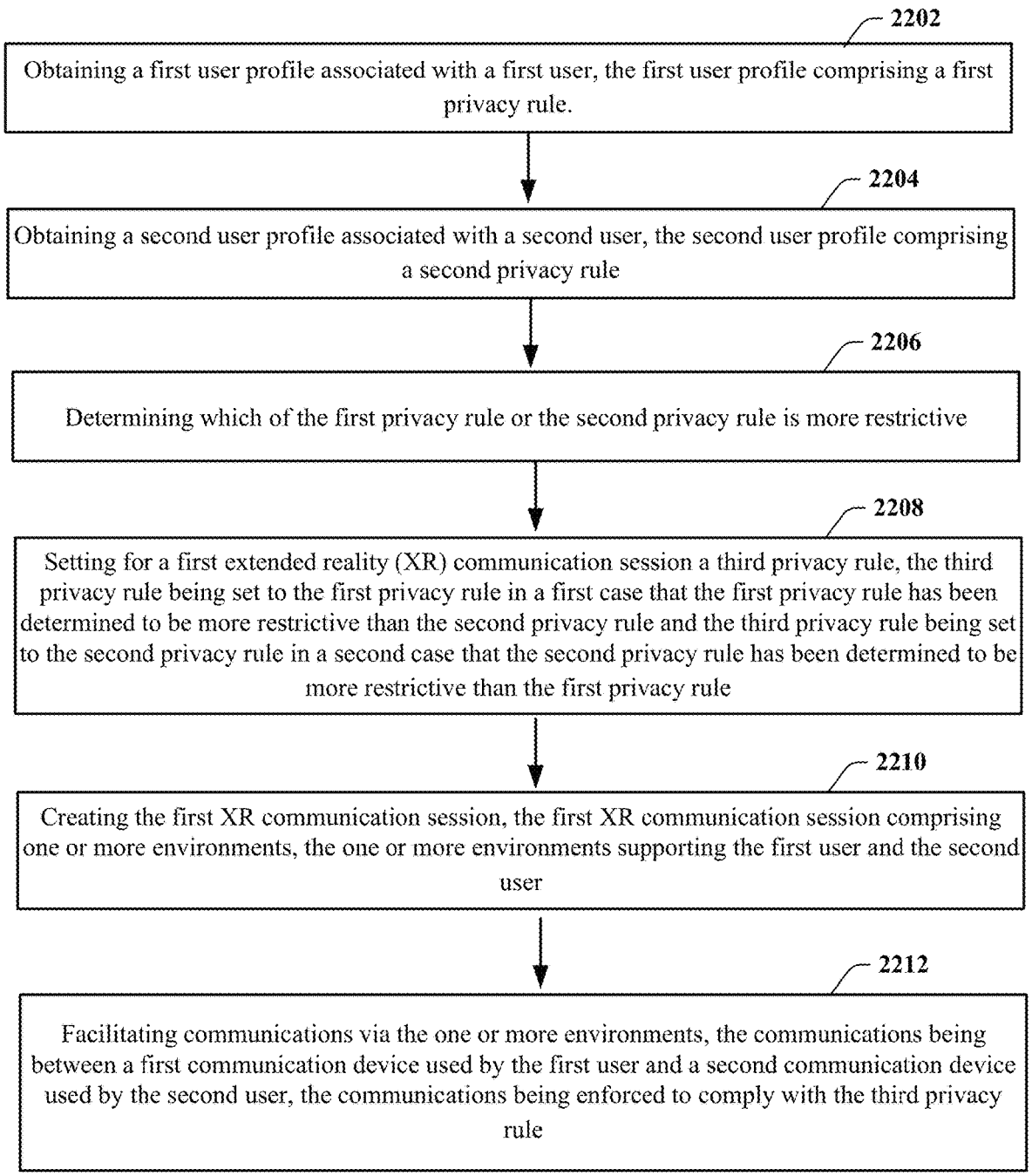
FIG. 2C depicts an illustrative embodiment of a method in accordance with various aspects described herein.

Referring now to FIG. 2C, various steps of a method 2200 according to an embodiment are shown. As seen in this FIG. 2C, step 2202 comprises obtaining a first user profile associated with a first user, the first user profile comprising a first privacy rule. Next, step 2204 comprises obtaining a second user profile associated with a second user, the second user profile comprising a second privacy rule. Next, step 2206 comprises determining which of the first privacy rule or the second privacy rule is more restrictive. Next, step 2208 comprises setting for a first extended reality (XR) communication session a third privacy rule, the third privacy rule being set to the first privacy rule in a first case that the first privacy rule has been determined to be more restrictive than the second privacy rule and the third privacy rule being set to the second privacy rule in a second case that the second privacy rule has been determined to be more restrictive than the first privacy rule. Next, step 2210 comprises creating the first XR communication session, the first XR communication session comprising one or more environments, the one or more environments supporting the first user and the second user. Next, step 2212 comprises facilitating communications via the one or more environments, the communications being between a first communication device used by the first user and a second communication device used by the second user, the communications being enforced to comply with the third privacy rule.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
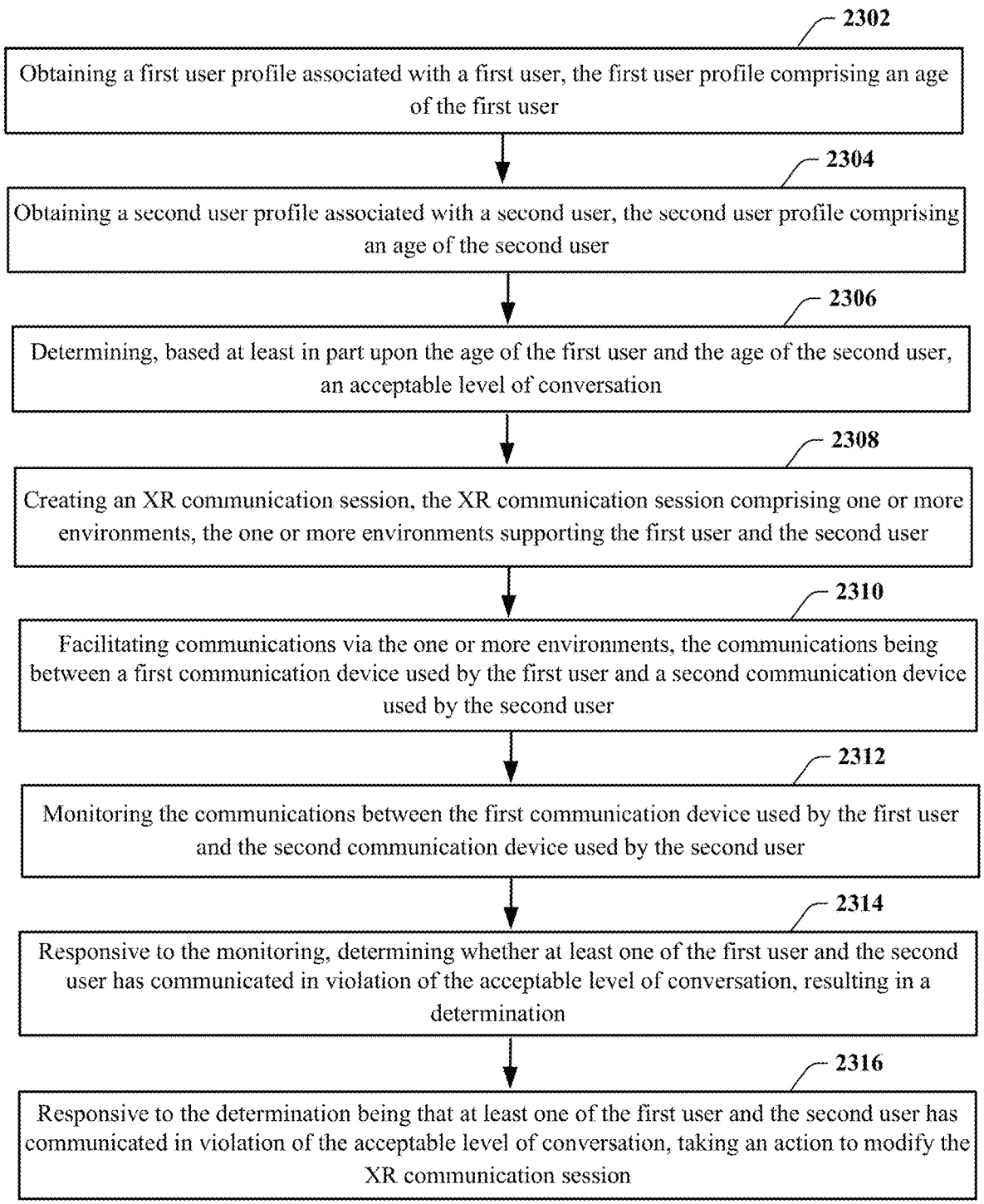
FIG. 2D depicts an illustrative embodiment of a method in accordance with various aspects described herein.

Referring now to FIG. 2D, various steps of a method 2300 according to an embodiment are shown. As seen in this FIG. 2D, step 2302 comprises obtaining a first user profile associated with a first user, the first user profile comprising an age of the first user. Next, step 2304 comprises obtaining a second user profile associated with a second user, the second user profile comprising an age of the second user. Next, step 2306 comprises determining, based at least in part upon the age of the first user and the age of the second user, an acceptable level of conversation. Next, step 2308 comprises creating an XR communication session, the XR communication session comprising one or more environments, the one or more environments supporting the first user and the second user. Next, step 2310 comprises facilitating communications via the one or more environments, the communications being between a first communication device used by the first user and a second communication device used by the second user. Next, step 2312 comprises monitoring the communications between the first communication device used by the first user and the second communication device used by the second user. Next, step 2314 comprises responsive to the monitoring, determining whether at least one of the first user and the second user has communicated in violation of the acceptable level of conversation, resulting in a determination. Next, step 2316 comprises responsive to the determination being that at least one of the first user and the second user has communicated in violation of the acceptable level of conversation, taking an action to modify the XR communication session.

In one example, the action to modify the XR communication session can comprise terminating the XR communication session. In another example, the action to modify the XR communication session can comprise moving either the first user or the second user to another XR communication session.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
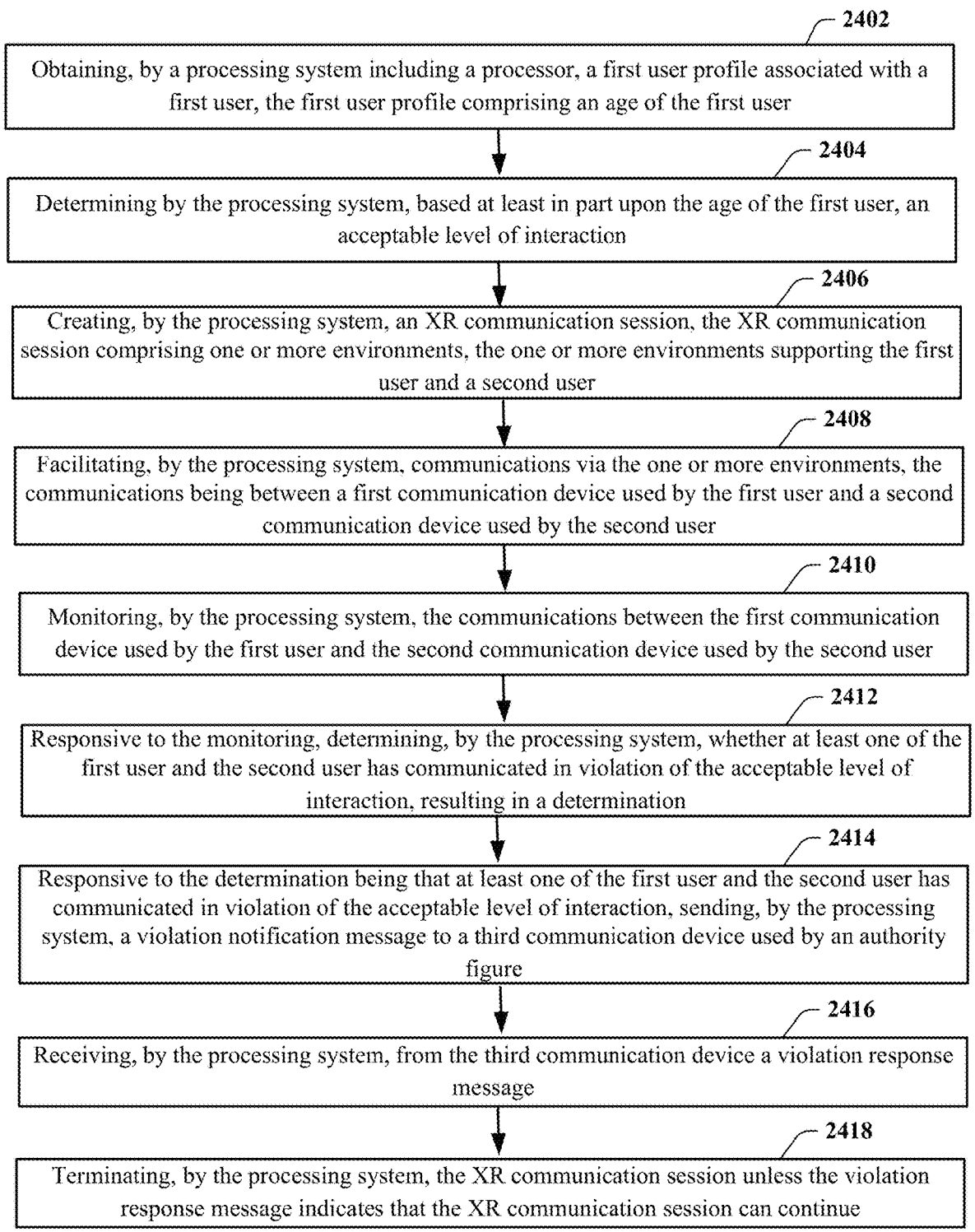
FIG. 2E depicts an illustrative embodiment of a method in accordance with various aspects described herein.

Referring now to FIG. 2E, various steps of a method 2400 according to an embodiment are shown. As seen in this FIG. 2E, step 2402 comprises obtaining, by a processing system including a processor, a first user profile associated with a first user, the first user profile comprising an age of the first user. Next, step 2404 comprises determining by the processing system, based at least in part upon the age of the first user, an acceptable level of interaction. Next, step 2406 comprises creating, by the processing system, an XR communication session, the XR communication session comprising one or more environments, the one or more environments supporting the first user and a second user. Next, step 2408 comprises facilitating, by the processing system, communications via the one or more environments, the communications being between a first communication device used by the first user and a second communication device used by the second user. Next, step 2410 comprises monitoring, by the processing system, the communications between the first communication device used by the first user and the second communication device used by the second user. Next, step 2412 comprises responsive to the monitoring, determining, by the processing system, whether at least one of the first user and the second user has communicated in violation of the acceptable level of interaction, resulting in a determination. Next, step 2414 comprises responsive to the determination being that at least one of the first user and the second user has communicated in violation of the acceptable level of interaction, sending, by the processing system, a violation notification message to a third communication device used by an authority figure. Next, step 2416 comprises receiving, by the processing system, from the third communication device a violation response message. Next, step 2418 comprises terminating, by the processing system, the XR communication session unless the violation response message indicates that the XR communication session can continue.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments can provide a virtual assistant (VA) that creates a communication session with multiple environments, and is responsible for the privacy, permission and safety of the individuals in each of the environments/across the communication session.

As described herein, various embodiments can provide mechanisms to facilitate a two-way "trust" system that is created in advance of users entering the communication session so that the other users understand that rules/restrictions are for all, thereby creating a secure communication session/environment to continue with idea/content exchange, social/professional/personal interactions, etc.

As described herein, various embodiments can provide a system virtual assistant (VA) that manages the logistics, flow and experience between virtual, mixed and physical, and vice-versa based on user identity/authority/privileges and "trust" relationships.

As described herein, various embodiments can provide a system of check for communication sessions/environments with minors, that will enforce parental controls/limitations—and this would be inherited between communication sessions that are created by the VA.

As described herein, various embodiments can provide a system of prioritization of users so that the VA can organize new communication sessions/entry/negotiate with other user VAs around the highest authority user's availability and/or direction.

As described herein, various embodiments can provide a VA that performs actions (such as, for example, creating new communication sessions/moving users or subset of users into new communication sessions and/or environments)—and users can trust that the communication session/environment will have inherited the same privacy/permission/safety settings.

As described herein, various embodiments can provide a system virtual assistant (VA) that has a "Safe Space" protocol to protect the users' identify, safety, privacy.

As described herein, various embodiments can provide a VA that tracks the user(s) as they are moving between communication sessions and environments, and logs/provides to highest authority figure for data analysis and record-keeping.

As described herein, various embodiments can provide privacy, permission, and user safety management VA for XR experience.

As described herein, various embodiments can operate in the context of a professional or social situation, wherein the users want to limit certain communication sessions and/or environments around identity.

As described herein, various embodiments can provide for prioritization, so that communication sessions/environments can be setup on basis of user priority.

As described herein, various embodiments can provide logistics between communication sessions and/or environments, wherein there is management of each user's identity, privacy and security (e.g., management such that identity, privacy and security are not compromised).

As described herein, various embodiments can facilitate having a "trust" relationship (e.g., with the communication session creator) that allows for "automatic acceptance" of various VA actions (e.g., automatic acceptance of various system VA actions)—with the understanding that the system VA is protecting the users who are part of the communication session per pre-determined and known settings.

As described herein, various embodiments can address situations wherein user(s) are being bullied and/or threatened. For example, when users are in a communication session and environment, and they are faced with situations where they are being bullied and/or threatened, the system VA can provide a way to "rescue" them by issuing a "Safe Space" protocol—that records (e.g., essentially simultaneously records) the violation(s), expels the violator(s) and protects the other user(s) within a "Safe Space".

As described herein, various embodiments can provide a VA that creates a communication session with multiple environments, and is responsible for the privacy, permission and safety of the individuals in each of the environments/across the communication session.

As described herein, various embodiments can facilitate a two-way "trust" system that is created in advance of users entering the communication session, so that the other users understand that there are rules/restrictions for all, thereby creating a secure communication session/environment to continue with idea/content exchange, social/professional/personal interactions, etc.

As described herein, various embodiments can provide a system VA that manages the logistics, flow and experience between virtual, mixed and physical, and vice-versa based on user identity/authority/privileges and "trust" relationships.

As described herein, various embodiments can provide a system of checks for communication sessions/environments with minors, that will enforce parental controls/limitations—and this can be inherited between communication sessions that are created by the VA.

As described herein, various embodiments can provide a system of prioritization of users so that the VA can organize new communication sessions/entry/negotiate with other user VAs around the highest authority user's availability and/or direction.

As described herein, various embodiments can provide a VA that performs actions such as creating new communication sessions/moving users (or subset of users) into new communication sessions and/or environments.

As described herein, various embodiments can provide functionality wherein users can trust that a current communication session/environment will have inherited the same privacy/permission/safety settings as a prior communication session/environment.

As described herein, various embodiments can provide a "Safe Space" protocol to protect the users' identify, safety, privacy.

As described herein, various embodiments can provide a VA that tracks the user(s) as they are moving between communication sessions and environments, and logs/provides to highest authority figure for data analysis and record-keeping.

As described herein, various embodiments can be applied in the context of a use case where users are invited to join a Mixed Reality Session, where they will exchange information, content, interact with each other. All users want assurance that their identity and privacy settings are managed appropriately, and they are in a secure space. In one example, a system (e.g., via VA) creates a system of "trust" between each user VA (and/or directly with each user) by verifying identity, and sharing privacy and security settings so that there is transparency and understanding on what would occur when a given user joins the communication session. In another example, a VA moves users between communication sessions and/or environments as needed (such movement can be based on user identity/permissions).

As described herein, various embodiments can be applied in the context of a use case where parents want to ensure that their children are safe within the communication sessions and environments within a communication session. In one example, a VA ensures that minor children accounts are setup with specific parental restrictions/permissions prior to a child being allowed to enter the communication session. In one example, a VA proceeds to manage according to the most restrictive parental controls to ensure that all children are kept at the appropriate comfort level of the parents. In one example, a VA sets expectations of the parents on what type of information/content will be shared (e.g., PG-13 content for teenagers, "G" content for children under age 10, etc.). In one example, a VA requests exceptions with the parent (e.g., if teenager is being provided access to content/information about a sensitive topic).

As described herein, various embodiments can be applied in the context of a use case where there is a violation of communication session policy—for example, a user is attempting to gather private information about the other users within the communication session. In one example, a system VA expels the violator. In another example, a system VA tracks the activity and logs it/shares with the appropriate authority.

As described herein, various embodiments can provide mechanisms for social networking within, for example, a mixed reality space (such mechanisms can provide for logistics of secure, private, and/or public transactions). In various examples: (a) each individual can set-up a personal, professional, social type of account and communication sessions for interactions (e.g., VR/AR interactions); (b) the mechanisms can ensure that there is a smooth transition between these communication sessions, and optimize the experience of sharing information, content, content creation, tandem viewing, and sharing of the information; (c) the mechanisms can facilitate certain benefits, such as enabling setting-up multiple communication sessions and accessing jointly so that one could join any communication session group; and/or (d) the mechanisms can facilitate enforcement of "Rules" for personal information sharing while interacting via public forum vs a communication session where there are (for example) less restrictions.

As described herein, various embodiments can provide mechanisms for home and social lifestyle management (e.g., maintaining privacy and ensuring security). In various examples: (a) mechanisms can provide management of communication sessions (e.g., mixed reality sessions) and environments for family group, close friends, and general public; (b) mechanisms can facilitate expectation management of what is appropriate to share, and where this information is stored/becomes available to whom and when?; (c) mechanisms can facilitate mixed reality/mode socialization, social networking, office/professional group transitions (rules can be enforced regarding: (i) would all group members have access to jointly created content and/or details discussed during this interaction?; (ii) would there be takeaways from the communication session that would allow users to reference the interaction?; and/or (iii) would there be user ability to track their own behavior/communication sessions that were joined?—interaction management); and/or (d) mechanisms can track user behavior/dynamics when interacting and transitioning between different environments—in real-time and future event management.

As described herein, various embodiments can be applied in: (a) the virtual assistant/companion space; (b) in the AR/VR space; (c) in the automobile industry (e.g., with respect to the cross-platform and connected car/home concept); (d) in the robotics industry; and/or (e) in the security/cybersecurity area.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, some or all of the subsystems and functions of system 2000, some or all of the subsystems and functions of system 2100, and/or some or all of the functions of methods 2200, 2300, and/or 2400. For example, virtualized communication network 300 can facilitate in whole or in part a VA that implements privacy, permission, and/or user safety management in a communication session.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
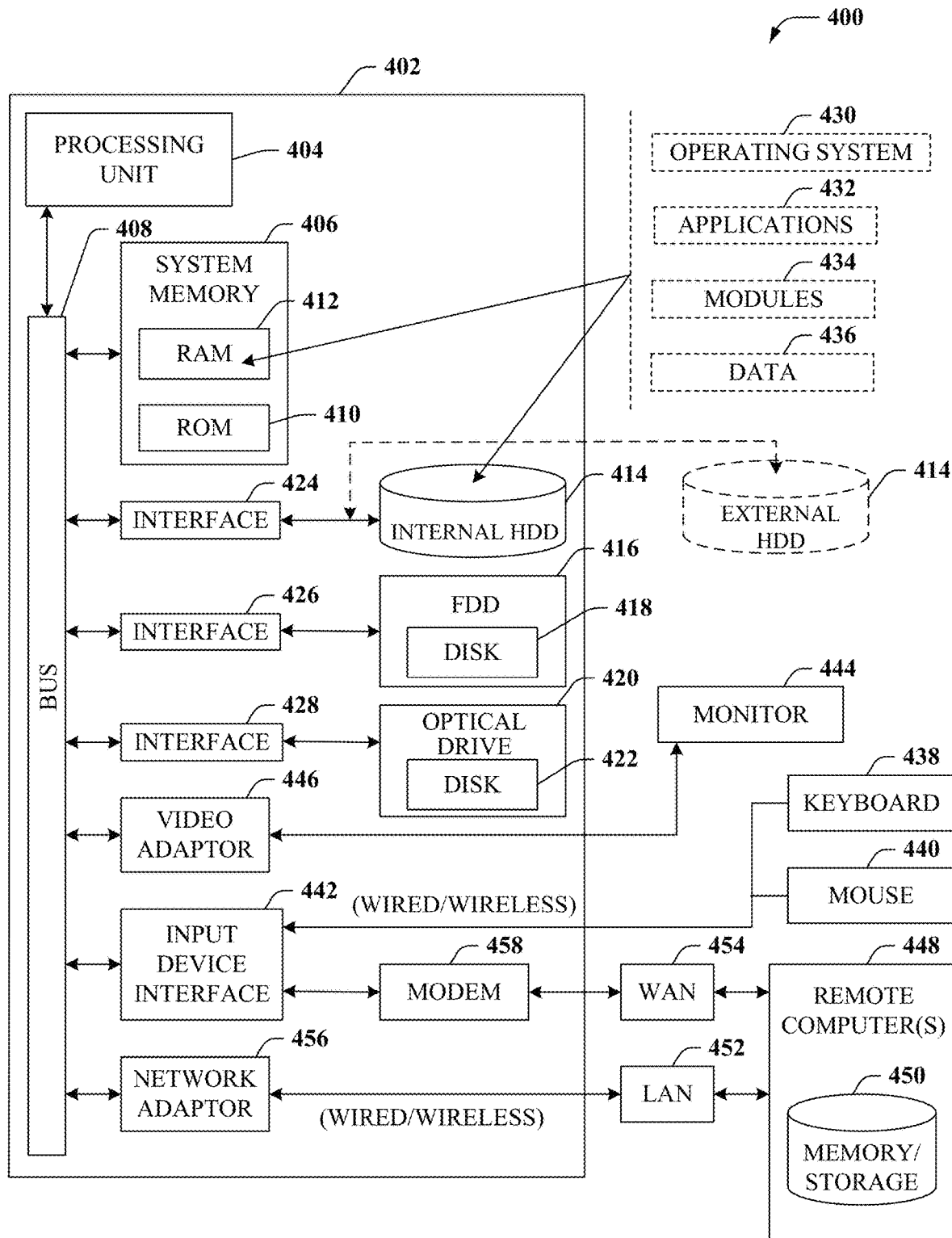
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a VA that implements privacy, permission, and/or user safety management in a communication session.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
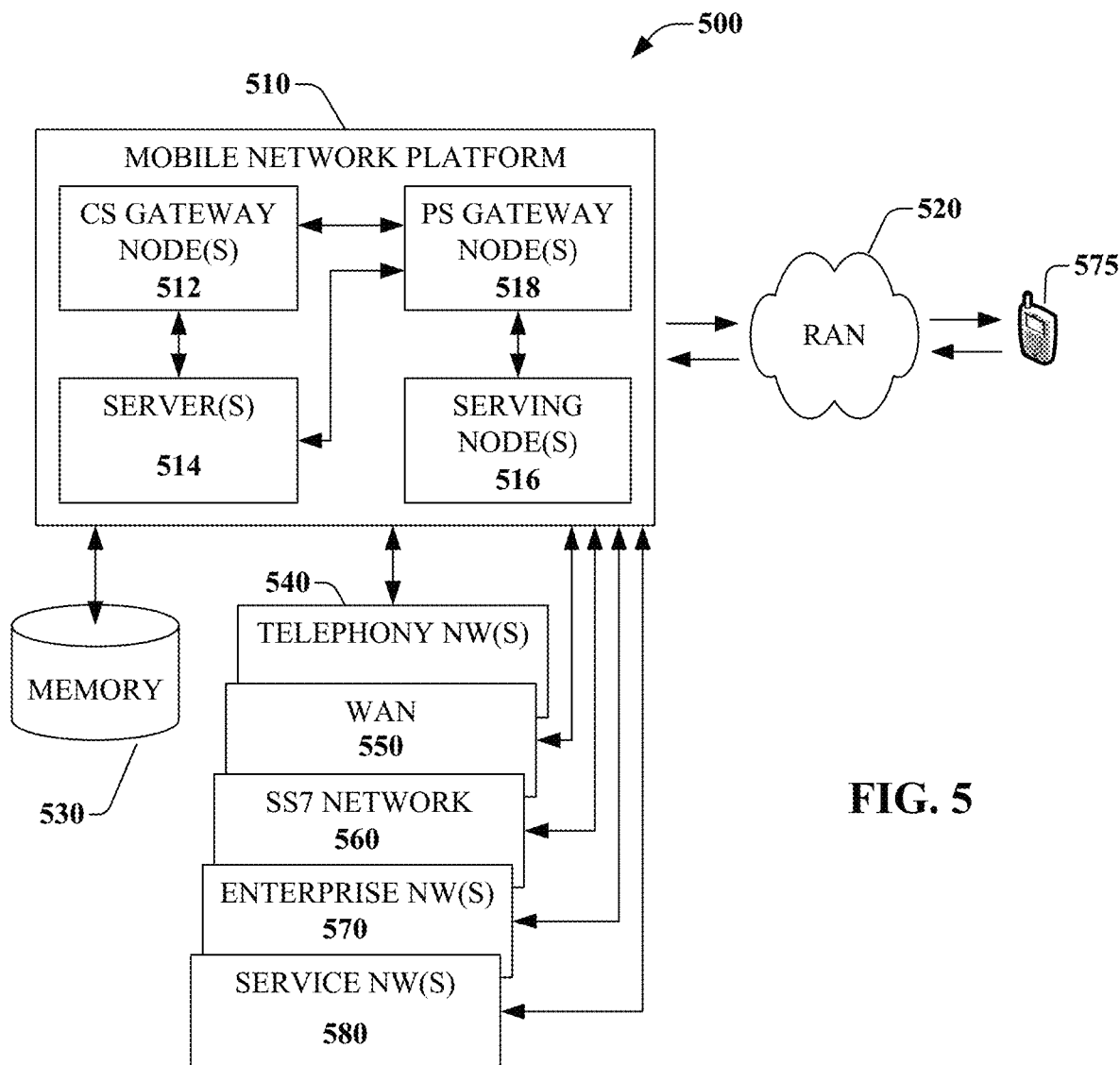
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a VA that implements privacy, permission, and/or user safety management in a communication session. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
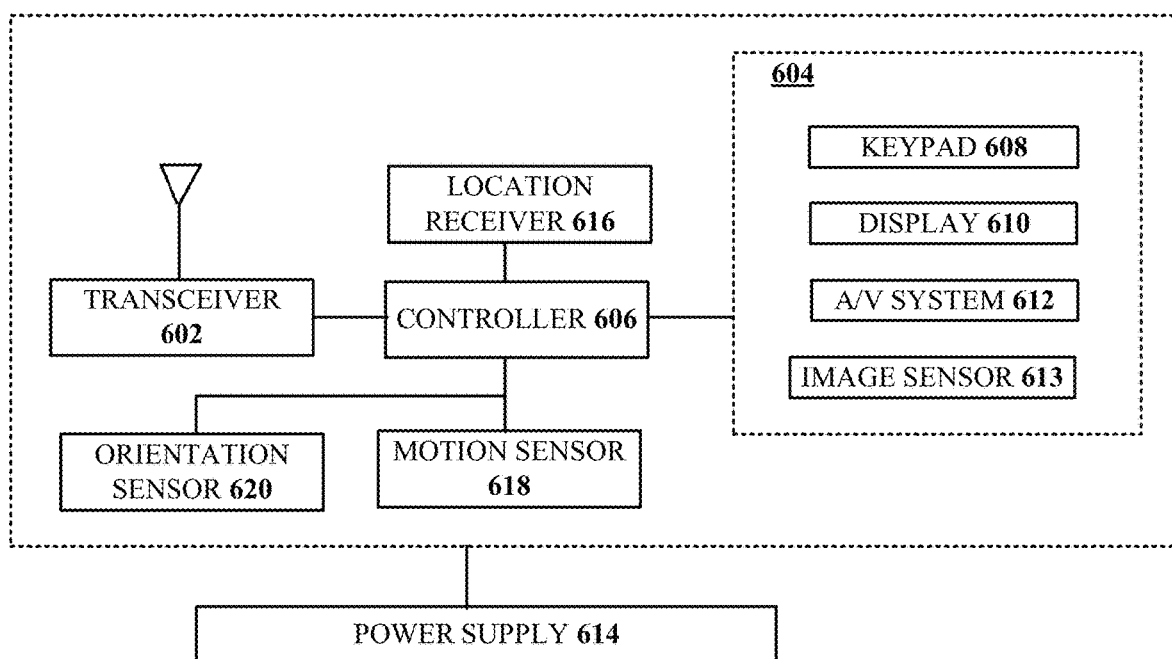
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a VA that implements privacy, permission, and/or user safety management in a communication session.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically implementing privacy, permission, and/or user safety management in a communication session) can employ various AI-based schemes for carrying out various embodiments thereof. Moreover, the classifier can be employed to determine a ranking or priority of each user, each environment, and/or each communication session. A classifier is a function that maps an input attribute vector, x=(x1, x2, x3, x4, . . . , xn), to a confidence that the input belongs to a class, that is, f(x)=confidence (class).

Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria various aspects of privacy, permission, and/or user safety management in a communication session, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
a processing system including a processor; and
a memory that stores executable instructions that, when executed by the processing system, facilitate performance of operations, the operations comprising:
obtaining a first user profile associated with a first user, the first user profile comprising a first privacy rule;
obtaining a second user profile associated with a second user, the second user profile comprising a second privacy rule;
determining which of the first privacy rule or the second privacy rule is more restrictive;
setting for a first extended reality (XR) communication session a third privacy rule, the third privacy rule being set to the first privacy rule in a first case that the first privacy rule has been determined to be more restrictive than the second privacy rule and the third privacy rule being set to the second privacy rule in a second case that the second privacy rule has been determined to be more restrictive than the first privacy rule;
creating the first XR communication session, the first XR communication session comprising a virtual reality (VR) environment, the VR environment supporting the first user and the second user;
facilitating communications via the VR environment, the communications being between a first communication device used by the first user and a second communication device used by the second user, the communications being enforced to comply with the third privacy rule; and
upon reaching a time limit, moving the communications between the first communication device and the second communication device from the VR environment to a respective mixed reality (MR) environment associated with each of the first and second communication devices.

2. The device of claim 1, wherein:
the first privacy rule comprises denying access by other people to all of first identifying information of the first user; and
the second privacy rule comprises granting access by other people to all of second identifying information of the second user.

3. The device of claim 1, wherein the first privacy rule being more restrictive than the second privacy rule comprises the first privacy rule denying access by other people to all of first identifying information of the first user and the second privacy rule granting access by other people to all of second identifying information of the second user.

4. The device of claim 1, wherein:
the first user profile further comprises a name of the first user and contact information of the first user;
the second user profile further comprises a name of the second user and contact information of the second user;
the first privacy rule comprises granting access by other people to the name of the first user while denying access by other people to the contact information of the first user; and
the second privacy rule comprises granting access by other people to the name of the second user and to the contact information of the second user.

5. The device of claim 1, wherein:
the first user profile further comprises a name of the first user and contact information of the first user;
the second user profile further comprises a name of the second user and contact information of the second user; and
the first privacy rule being more restrictive than the second privacy rule comprises the first privacy rule granting access by other people to the name of the first user while denying access by other people to the contact information of the first user and the second privacy rule granting access by other people to the name of the second user and to the contact information of the second user.

6. The device of claim 1, wherein:
the first user profile further comprises a name of the first user and contact information of the first user;
the second user profile further comprises a name of the second user and contact information of the second user; and
the first privacy rule being more restrictive than the second privacy rule comprises the first privacy rule granting access by other people to the contact information of the first user while denying access by other people to the name of the first user and the second privacy rule granting access by other people to the name of the second user and to the contact information of the second user.

7. The device of claim 1, wherein:
the first user profile further comprises a name of the first user and contact information of the first user;
the second user profile further comprises a name of the second user and contact information of the second user;
the name of the first user comprises a given name of the first user and a surname of the first user;
the name of the second user comprises a given name of the second user and a surname of the second user;
the contact information of the first user comprises an email address of the first user and a postal address of the first user; and
the contact information of the second user comprises an email address of the second user and a postal address of the second user.

8. The device of claim 7, wherein the first privacy rule being more restrictive than the second privacy rule comprises the first privacy rule granting access by other people to the given name of the first user while denying access by other people to the surname of the first user and the second privacy rule granting access by other people to both the given name of the second user and the surname of the second user.

9. The device of claim 7, wherein the first privacy rule being more restrictive than the second privacy rule comprises the first privacy rule granting access by other people to the email address of the first user while denying access by other people to the postal address of the first user and the second privacy rule granting access by other people to both the email address of the second user and the postal address of the second user.

10. The device of claim 1, wherein the operations further comprise:
obtaining a third user profile associated with a third user, the third user profile comprising a fourth privacy rule;
obtaining a fourth user profile associated with a fourth user, the fourth user profile comprising a fifth privacy rule;
determining which of the fourth privacy rule or the fifth privacy rule is more restrictive;
setting for a second XR communication session a sixth privacy rule, the sixth privacy rule being set to the fourth privacy rule in a third case that the fourth privacy rule has been determined to be more restrictive than the fifth privacy rule and the sixth privacy rule being set to the fifth privacy rule in a fourth case that the fifth privacy rule has been determined to be more restrictive than the fourth privacy rule;
creating the second XR communication session, the second XR communication session comprising one or more environments, the one or more environments supporting the third user and the fourth user; and
facilitating other communications via the one or more environments, the other communications being between a third communication device used by the third user and a fourth communication device used by the fourth user, the other communications being enforced to comply with the sixth privacy rule.

11. The device of claim 1, wherein:
the first communication device used by the first user comprises a first desktop computer, a first laptop computer, a first notebook computer, a first tablet computer, a first smartphone, first head mounted glasses, first head mounted goggles, or any first combination thereof; and
the second communication device used by the second user comprises a second desktop computer, a second laptop computer, a second notebook computer, a second tablet computer, a second smartphone, second head mounted glasses, second head mounted goggles, or any second combination thereof.

12. A non-transitory machine-readable medium comprising executable instructions that, when executed by a processing system including a processor, facilitate performance of operations, the operations comprising:
obtaining a first user profile associated with a first user, the first user profile comprising a first privacy rule;
obtaining a second user profile associated with a second user, the second user profile comprising a second privacy rule;
determining which of the first privacy rule or the second privacy rule is more restrictive;
setting for a first extended reality (XR) communication session a third privacy rule, the third privacy rule being set to the first privacy rule in a first case that the first privacy rule has been determined to be more restrictive than the second privacy rule and the third privacy rule being set to the second privacy rule in a second case that the second privacy rule has been determined to be more restrictive than the first privacy rule;

creating the first XR communication session, the first XR communication session comprising a virtual reality (VR) environment, the VR environment supporting the first user and the second user;

facilitating communications via the VR environment, the communications being between a first communication device used by the first user and a second communication device used by the second user, the communications being enforced to comply with the third privacy rule; and responsive to reaching a time limit, moving the communications between the first communication device and the second communication device from the VR environment to a respective mixed reality (MR) environment associated with each of the first and second communication devices.

13. The non-transitory machine-readable medium of claim 12, wherein:

the first privacy rule comprises denying access by other people to all of first identifying information of the first user; and the second privacy rule comprises granting access by other people to all of second identifying information of the second user.

14. A method comprising:

obtaining, by a processing system including a processor, a first user profile associated with a first user, the first user profile comprising a first privacy rule;

obtaining, by the processing system, a second user profile associated with a second user, the second user profile comprising a second privacy rule;

determining, by the processing system, which of the first privacy rule or the second privacy rule is more restrictive;

setting, by the processing system, for a first extended reality (XR) communication session a third privacy rule, the third privacy rule being set to the first privacy rule in a first case that the first privacy rule has been determined to be more restrictive than the second privacy rule and the third privacy rule being set to the second privacy rule in a second case that the second privacy rule has been determined to be more restrictive than the first privacy rule;

creating, by the processing system, the first XR communication session, the first XR communication session comprising a virtual reality (VR) environment, the VR environment supporting the first user and the second user;

facilitating, by the processing system, communications via the VR environment, the communications being between a first communication device used by the first user and a second communication device used by the second user, the communications being enforced to comply with the third privacy rule; and when a time limit is reached, moving, by the processing system, the communications between the first communication device and the second communication device from the VR environment to a respective mixed reality (MR) environment associated with each of the first and second communication devices.

15. The method of claim 14, wherein the first privacy rule being more restrictive than the second privacy rule comprises the first privacy rule denying access by other people to all of first identifying information of the first user and the second privacy rule granting access by other people to all of second identifying information of the second user.

16. The method of claim 14, wherein:

the first communication device used by the first user comprises a first desktop computer, a first laptop computer, a first notebook computer, a first tablet computer, a first smartphone, first head mounted glasses, first head mounted goggles, or any first combination thereof; and the second communication device used by the second user comprises a second desktop computer, a second laptop computer, a second notebook computer, a second tablet computer, a second smartphone, second head mounted glasses, second head mounted goggles, or any second combination thereof.

17. The non-transitory machine-readable medium of claim 12, wherein the first privacy rule being more restrictive than the second privacy rule comprises the first privacy rule denying access by other people to all of first identifying information of the first user and the second privacy rule granting access by other people to all of second identifying information of the second user.

18. The non-transitory machine-readable medium of claim 12, wherein:

the first user profile further comprises a name of the first user and contact information of the first user;

the second user profile further comprises a name of the second user and contact information of the second user;

the first privacy rule comprises granting access by other people to the name of the first user while denying access by other people to the contact information of the first user; and the second privacy rule comprises granting access by other people to the name of the second user and to the contact information of the second user.

19. The non-transitory machine-readable medium of claim 12, wherein:

the first user profile further comprises a name of the first user and contact information of the first user;

the second user profile further comprises a name of the second user and contact information of the second user; and the first privacy rule being more restrictive than the second privacy rule comprises the first privacy rule granting access by other people to the name of the first user while denying access by other people to the contact information of the first user and the second privacy rule granting access by other people to the name of the second user and to the contact information of the second user.

20. The non-transitory machine-readable medium of claim 12, wherein:

the first user profile further comprises a name of the first user and contact information of the first user;

the second user profile further comprises a name of the second user and contact information of the second user; and the first privacy rule being more restrictive than the second privacy rule comprises the first privacy rule granting access by other people to the contact information of the first user while denying access by other people to the name of the first user and the second privacy rule granting access by other people to the name of the second user and to the contact information of the second user.

* * * * *